United States Patent
Tracht (10) Patent No.: US 8,439,394 B2
(45) Date of Patent: May 14, 2013

(54) AIR BAG WITH INTEGRAL PROTECTION MEMBER

(75) Inventor: Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/315,842

(22) Filed: Dec. 9, 2011

(65) Prior Publication Data

US 2012/0175862 A1    Jul. 12, 2012

(30) Foreign Application Priority Data

Jan. 12, 2011  (DE) .......................... 10 2011 002 561

(51) Int. Cl.
*B60R 21/207* (2006.01)

(52) U.S. Cl.
USPC .................................... 280/728.3; 280/730.2

(58) Field of Classification Search ............... 280/730.2, 280/728.1, 728.3, 728.2
See application file for complete search history.

(56) References Cited

U.S. PATENT DOCUMENTS

| | | | |
|---|---|---|---|
| 5,498,030 A | 3/1996 | Hill et al. | |
| 5,749,597 A | 5/1998 | Saderholm | |
| 6,045,151 A | 4/2000 | Wu | |
| 6,106,007 A * | 8/2000 | Kretschmer et al. | ........ 280/730.2 |
| 6,206,466 B1 | 3/2001 | Komatsu | |
| 6,237,934 B1 | 5/2001 | Harrell et al. | |
| 6,386,577 B1 | 5/2002 | Kan et al. | |
| 6,450,528 B1 | 9/2002 | Suezawa et al. | |
| 2002/0130495 A1 | 9/2002 | Lotspih et al. | |

FOREIGN PATENT DOCUMENTS

| | | |
|---|---|---|
| DE | 10 2009 042 594 A1 | 12/2010 |
| WO | 2010136129 A1 | 12/2010 |

OTHER PUBLICATIONS

German Office Acton Dated Sep. 20, 2011, Applicant Lear Corporation, Application No. 10 2011 002 561.8, 6 Pages.

* cited by examiner

*Primary Examiner* — Drew Brown (57) ABSTRACT

A vehicle seat assembly according to the present disclosure includes an air bag module having an air bag and an inflator associated with the air bag. The air bag includes a main body configured to be inflated by the inflator, and an extension formed integrally with the main body and at least partially covering the main body. The seat assembly further includes a seat pad disposed outside the air bag module, and a trim cover positioned over the seat pad. Upon inflation of the main body of the air bag, at least a portion of the extension is configured to move forwardly such that the at least a portion of the extension extends between the seat pad and the main body, or between the trim cover and the main body.

20 Claims, 5 Drawing Sheets

AIR BAG WITH INTEGRAL PROTECTION MEMBER

CROSS-REFERENCE TO RELATED APPLICATIONS

This application claims foreign priority benefits under 35 U.S.C. §119(a)-(d) to DE 10 2011 002 561.8, filed Jan. 12, 2011, which is hereby incorporated by reference in its entirety.

BACKGROUND

1. Field of the Disclosure

The present disclosure relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY

A vehicle seat assembly according to the present disclosure includes an air bag module having an air bag and an inflator associated with the air bag. The air bag includes a main body configured to be inflated by the inflator, and an extension formed integrally with the main body and at least partially covering the main body. The main body has a front, and a portion of the extension is disposed rearward of the front of the main body. The seat assembly further includes a seat pad disposed outside the air bag module, and a trim cover positioned over the seat pad. Upon inflation of the main body of the air bag, the portion of the extension is configured to move forwardly such that the portion of the extension extends between the seat pad and the main body, or between the trim cover and the main body.

An air bag module for use with a vehicle seat having a seat pad and a trim cover is also disclosed. The air bag module includes an inflator and an air bag associated with the inflator. The air bag includes a main body configured to be inflated by the inflator, and an extension formed integrally with the main body and at least partially covering the main body. The main body has a front, and the extension includes a portion disposed rearward of the front of the main body. Upon inflation of the main body of the air bag, the portion of the extension is configured to move forwardly such that the portion of the extension extends between the seat pad and the main body, or between the trim cover and the main body.

Still further, a vehicle seat assembly according to the present disclosure includes an air bag module having a front and a side. The air bag module has an air bag and an inflator associated with the air bag. The air bag includes a main body configured to be inflated by the inflator, and an extension formed integrally with the main body and surrounding the main body such that the extension forms an outermost portion of the air bag module. The extension has a frangible portion that at least partially defines a flap portion. The flap portion extends at least partially along the front and the side of the air bag module and has an end spaced away from the front of the air bag module. The seat assembly further includes a seat pad portion disposed in front of the air bag module, and a trim cover positioned over the seat pad portion. Upon inflation of the main body of the air bag, the frangible portion is configured to rupture and the end of the flap portion is configured to move forwardly such that the flap portion extends between the seat pad portion and the air bag, or between the trim cover and the air bag.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various vehicle seat configurations that include an inflatable air bag assembly. Several specific embodiments are set forth in the following description and in FIGS. 1-17 to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

Figure 1:
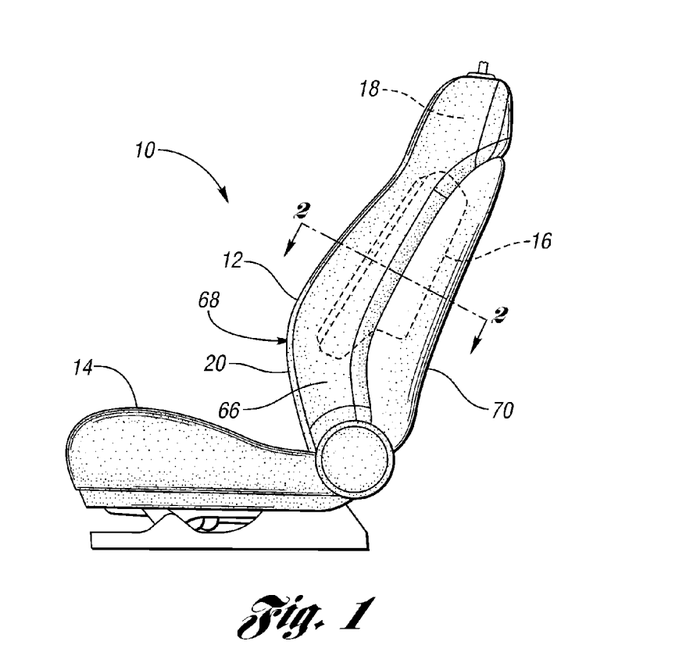
FIG. 1 is a side view of a vehicle seat assembly according to the present disclosure and including an air bag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as a soft cover air bag module 16, a seat pad 18 overlaying the air bag module 16, and a trim cover 20 overlaying the seat pad 18 and air bag module 16.

Figure 2:
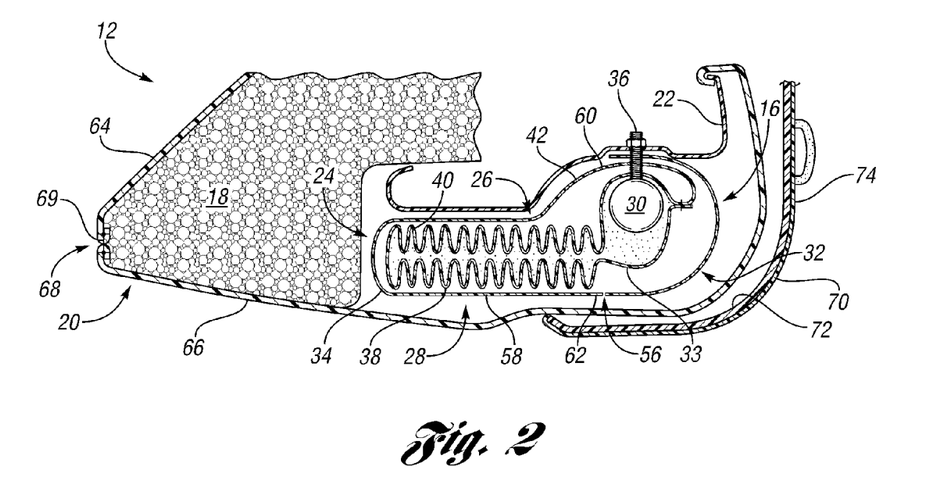
FIG. 2 is a fragmentary cross-sectional view of the seat back cushion assembly taken along line 2-2 of FIG. 1 and showing various components of the air bag module, including an air bag having an inflatable main body and a cover portion that covers the main body.
Figure 3:
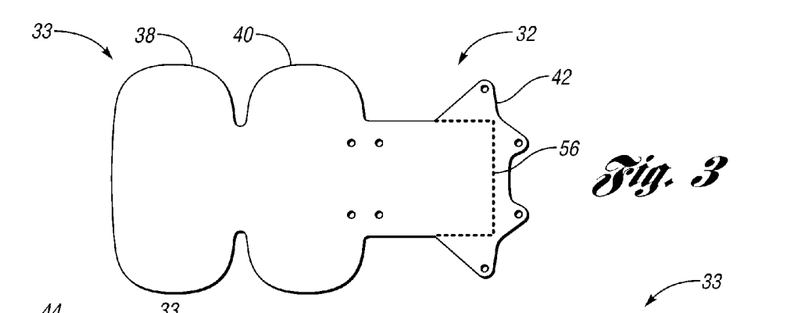
FIG. 3 is a schematic view of a cut portion of material for use in making the main body and cover portion of the air bag.
Figure 4:
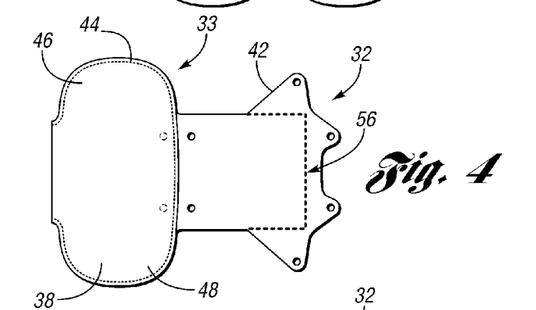
FIG. 4 is a schematic view of the cut portion of material of FIG. 3, with first and second sections folded together and connected together to form the main body.

As shown in FIG. 2, the air bag module 16 may be disposed proximate one side of the seat back cushion assembly 12, such as an outboard lateral side or an inboard lateral side, and may be connected to a support member, such as a seat back frame 22. In the embodiment shown in FIG. 2, the air bag module 16 is disposed on an outboard side of the seat back frame 22. As another example, the air bag module 16 may be connected to the frame 22 such that the air bag module 16 is disposed on an inboard side of the frame 22. As yet another example, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

In the embodiment shown in FIG. 2, the air bag module 16 has a front 24 and first and second sides, such as inboard and outboard sides 26 and 28, respectively. The inboard side 26 is positioned closer to the center of the seat back cushion assembly 12 than the outboard side 28, and the outboard side 28 may be positioned proximate a door panel of a vehicle in which the seat assembly is installed. Furthermore, the air bag module 16 includes an inflator 30, and an air bag 32 having an inflatable portion or main body 33 and an integral cover portion 34 described below in detail.

The inflator 30 may be connected to the frame 22, or other suitable support member, in any suitable manner, such as with one or more fasteners 36. The fasteners 36, which may each include a bolt and nut for example, may also be used to connect the cover portion 34 to the frame 22. Alternatively, the air bag module 16 may be connected to the frame 22, or other suitable support member, in any suitable manner.

The air bag 32 may be made of any suitable flexible material, such as nylon, Kevlar®, or any other suitable polyamide, synthetic material, or natural material. Furthermore, the air bag 32 may be formed of a single piece of flexible material, or multiple pieces of material connected together such as by sewn stitches. In the embodiments shown in FIGS. 2-4, for example, the entire air bag 32 is formed as a single piece of material cut from a roll of material. The main body 33 includes first and second sections 38 and 40, respectively, that are folded and connected together, such as by a sewn seam 44. The air bag 32 also includes a third section or extension 42, that extends from the second section 40 and forms the cover portion 34. As another example, the second section 40 and the extension 42 may be formed as a single piece, and the first section 38 may also be formed as a single piece that is sewn to the second section 40.

Figure 5:
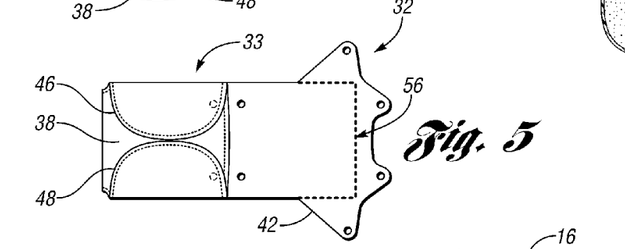
FIG. 5 is a schematic view of the main body and cover portion of the air bag, with top and bottom portions of the main body folded inwardly toward a center of the main body.

The main body 33 may be folded, rolled or otherwise consolidated in any suitable manner so that it can be at least partially covered by the extension 42. Referring to FIG. 5, for example, top and bottom portions 46 and 48, respectively, of the main body 33 may be folded toward a central portion of the main body 33. The main body 33 may then be folded in an accordion type configuration having one or more folded pleats 50, schematically represented in FIG. 6.

Figure 6:
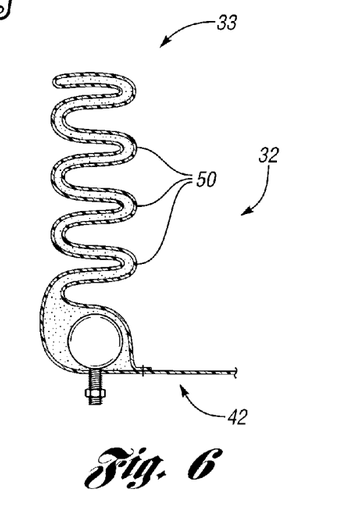
FIG. 6 is a schematic view of the air bag showing the main body folded into an accordion-type configuration.
Figure 7:
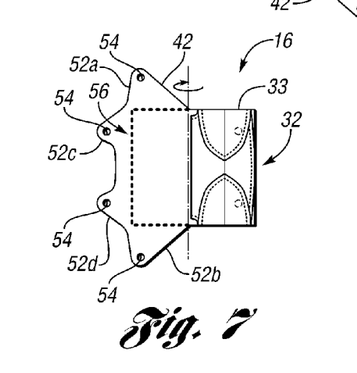
FIG. 7 is a schematic view of the air bag with the cover portion partially folded over the main body, such that the cover portion covers an inboard side of the main body.
Figure 8:
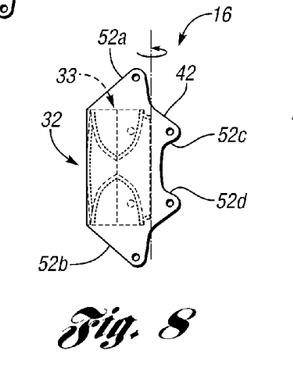
FIG. 8 is a schematic view of the air bag with the cover portion folded over an outboard side the main body.
Figure 9:
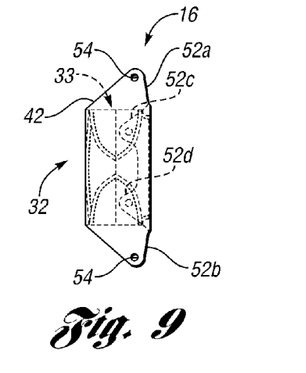
FIG. 9 is a schematic view of the air bag with side tabs of the cover portion folded over the inboard side of the main body.

The inflator 30 may be positioned between the first and second sections 38 and 40 prior to connecting those sections together. As another example, the inflator 30 may be inserted between the sections 38 and 40 through a small opening, such as a gap in the seam 44, after the sections 38 and 40 have been folded or otherwise consolidated. The small opening may then be closed, such as by a sewing operation, or it may remain open.

Referring to slides 7-10, the extension 42 is configured to wrap around the main body 33 such that the extension 42 partially or fully covers the main body 33. The extension 42 may also be provided with one or more tab portions 52a-d that each have an opening 54 for receiving a fastener, such as a fastener 36. In the embodiment shown in FIG. 10, the tabs 52a-d are folded over to the inboard side 26 of the air bag module 16 such that the openings 54 in tabs 52a and 52b are aligned with the openings 54 in tabs 52c and 52d, respectively.

Figure 10:
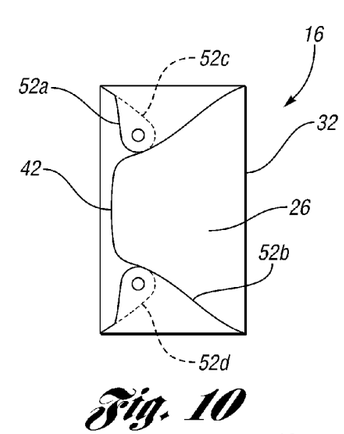
FIG. 10 is a schematic view of the air bag with top and bottom tabs of the cover portion folded over the inboard side of the main body.

In the embodiment shown in FIGS. 2 and 10, the extension 42 completely surrounds the main body 33 and inflator 30, and forms the outermost portion of the air bag module 16. In such an embodiment, the air bag module 16 does not include a rigid housing, such as a plastic housing, and may be referred to as a "soft cover" air bag module. In other "soft cover" embodiments, the extension 42 may partially cover or surround the main body 33 and/or inflator 32.

In the embodiment shown in FIG. 2, the extension 42 has a frangible portion 56, such as a rupture or tear section or seam, that at least partially defines a protection portion, such as flap portion 58, which is described below in more detail. For example, the frangible portion 56 may be a sewn seam or a perforated or otherwise weakened section or area of the extension 42 that is designed to rupture upon inflation of the main body 33 of the air bag 32.

While the frangible portion 56 may have any suitable configuration, example configurations are shown in FIGS. 11-14. In the embodiment shown in FIG. 11, the frangible portion 56 extends along top and bottom portions of the front 24 of the air bag module 16, and along top, rear and bottom portions of the outboard side 28 of the air bag module 16. In the embodiment shown in FIG. 12, the frangible portion 56 extends from the front 24 of the air bag module 16 along top, rear and bottom portions of the air bag module 16. In the embodiment shown in FIG. 13, the frangible portion 56 extends partially along the outboard side 28 of the air bag module 16, and partially along the top and bottom portions of the air bag module 16. In the embodiment shown in FIG. 14, the frangible portion 56 is disposed on the inboard side 26 of the air bag module 16 at or near the fasteners 36. More specifically, the frangible portion 56 in that embodiment includes multiple sections that each extend from an opening 54 to an outer surface or edge of the extension 42, as shown in phantom lines in FIG. 14. As another example, the frangible portion 56 may be disposed partially on the inboard side 26 of the air bag module 16.

Figure 11:
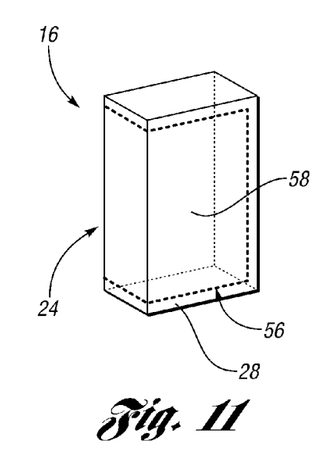
FIG. 11 is a schematic view of the air bag module showing an example configuration of a frangible portion of the cover portion.
Figure 12:
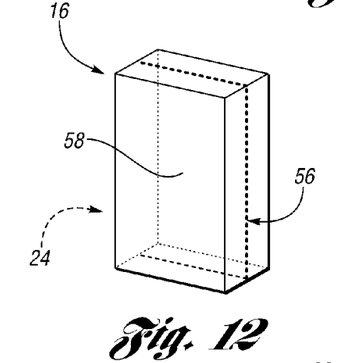
FIG. 12 is a schematic view of the air bag module showing another example configuration of the frangible portion of the cover portion.
Figure 13:
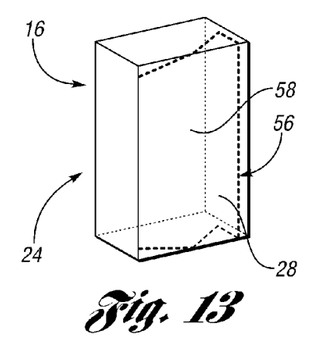
FIG. 13 is a schematic view of the air bag module showing yet another example configuration of the frangible portion of the cover portion.
Figure 14:
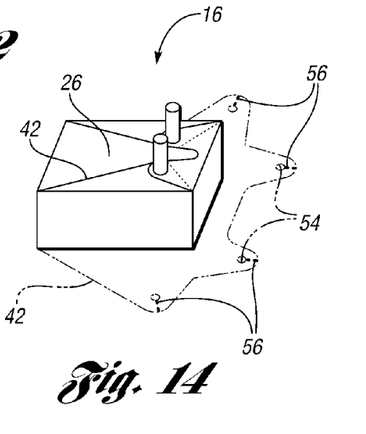
FIG. 14 is a schematic view of the air bag module showing still yet another example configuration of the frangible portion of the cover portion, with the cover portion shown in solid lines fully folded over to the inboard side of the air bag module, and with the cover portion also shown in phantom lines not fully folded over to the inboard side of the air bag module.

In each of the embodiments shown in FIGS. 11-13, at least a section of the frangible portion 56 extends generally vertically or upwardly along the entire length or height of the air bag module 16, or a substantial portion of the height of the air bag module 16, and that section is spaced rearwardly away from the front 24 of the air bag module 16. For example, the generally upwardly extending section of the frangible portion 56 may extend at least 50% of the height of the air bag module 16. As another example, the generally upwardly extending section of the frangible portion 56 may extend at least 75% of the height of the air bag module 16.

Returning to FIG. 2, the illustrated flap portion 58 extends along the front 24 and sides 26 and 28 of the air bag module 16. Furthermore, the flap portion 58 has a first secured portion or end 60, and a second releasable portion or end 62 disposed adjacent the frangible portion 56. In the embodiment shown in FIG. 2, the first end 60 is attached to the frame 22 with one or more of the fasteners 36. Alternatively, the first end 60 may be secured in any suitable manner.

In the embodiment shown in FIG. 2, the second end 62 is disposed on the outboard side 28 of the air bag module 16 rearward of the front 24 of the air bag module 16, and the second end 62 faces rearwardly. As another example the second end 62 may be disposed at or near a rear portion of the air bag module 16. As yet another example, such as the embodiment shown in FIG. 14, the second end 62 may be disposed on the inboard side 26 of the air bag module 16.

Upon inflation of the main body 33 of the air bag 32, the frangible portion 56 is configured to rupture to release the second end 62, such that the flap portion 58 may move or extend forwardly generally in a deployment direction of the main body 33. If the second end 62 is disposed on the inboard side 26 of the air bag module 16, the second end 62 may first move rearwardly before moving forwardly. When the flap portion 58 moves forwardly, the flap portion 58 may extend between a portion of the seat pad 18 and the main body 33, thereby protecting the seat pad 18 and/or the main body 33.

Still referring to FIG. 2, the seat pad 18 may be disposed adjacent the air bag module 16 and the frame 22. For example, the seat pad 18 may be disposed in front of and along an inboard side of the air bag module 16 and frame 22, as shown in FIG. 2. As another example, the seat pad 18 may be disposed in front of, behind and along the inboard and outboard sides 26 and 28 of the air bag module 16 and frame 22. In at least one embodiment, the seat pad 18 is made from a molded polymeric material, such as a polyurethane foam. Alternatively, the seat pad 18 may comprise any suitable material, and may be made in any suitable manner.

The trim cover 20 may be made of any suitable material, such as cloth, vinyl and/or leather, and may be provided with or without a padding layer and/or backing layer. Furthermore, the trim cover 20 may include multiple pieces that are joined together at seams. In the embodiment shown in FIGS. 1 and 2, the trim cover 20 includes first and second sections 64 and 66, respectively, that cooperate to define a deployment seam 68 through which the main body 33 of the air bag 32 may deploy. For example, the sections 64 and 66 may be connected together such as with sewn stitching 69, as shown in FIG. 2. As another example, ends of the first and second sections 64 and 66, respectively, may not be directly connected together, but merely abut each other to define the seam 68.

As shown in FIGS. 1 and 2, a relatively rigid back panel 70 may also be provided in the rear area of the seat back cushion assembly 12 to provide support, to cover a portion of the seat back cushion assembly 12 and/or for aesthetics. The panel 70 may include a main body 72, such as a plastic molding. In addition, the panel 70 may include a cover layer 74 made of any suitable material, such as cloth, leather or vinyl, attached to the main body 72.

Figure 15:
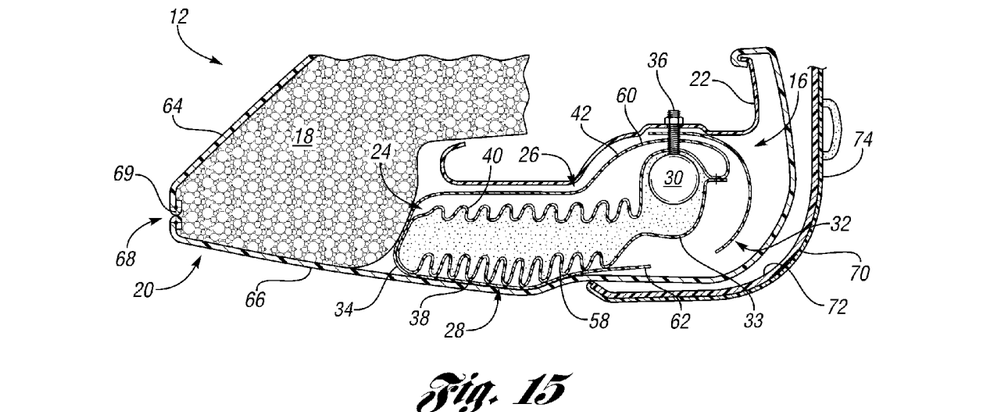
FIG. 15 is a fragmentary cross-sectional view of the seat back cushion assembly, similar to FIG. 2, showing the main body of the air bag partially inflated.
Figure 16:
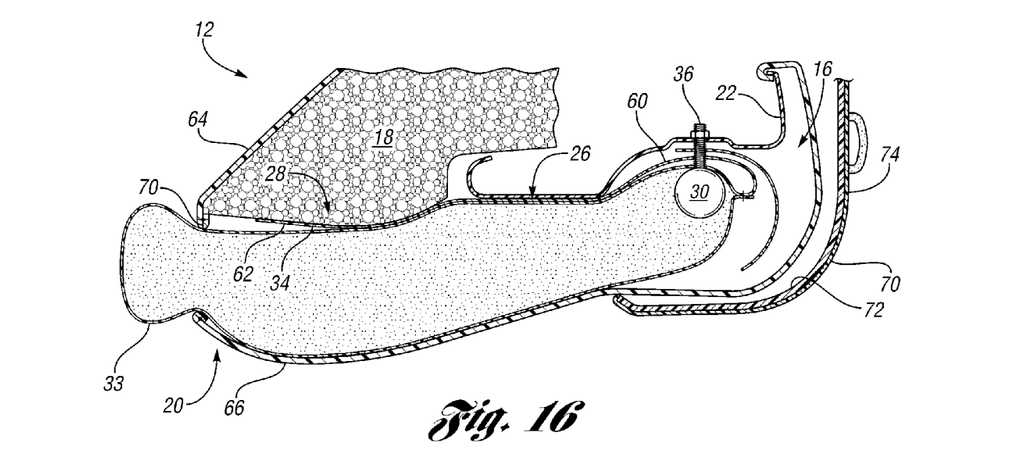
FIG. 16 is a fragmentary cross-sectional view of the seat back cushion assembly showing the main body of the air bag more fully inflated and an end of the cover portion extending forwardly.

Referring to FIGS. 2, 15 and 16, operation of the vehicle seat assembly 10 will now be described in detail. Upon a sufficient triggering event, such as impact to a vehicle in which the seat assembly 10 is mounted or other sufficient acceleration or deceleration event, for example, the air bag module 16 may be activated in any suitable manner to cause the main body 33 of the air bag 32 to deploy. During deployment, the inflator 30 inflates the main body 33 of the air bag 32, which causes the frangible portion 56 to rupture. As shown in FIG. 15, the expanding main body 33 causes a front portion and the second end 62 of the flap portion 58 to move forwardly.

Referring to FIG. 16, as the main body 33 continues to inflate, the main body 33 causes the second end 62 of the flap portion 58 to extend between the seat pad 18 and the main body 33. The inflating main body 33 may also rupture the deployment seam 68 so that the main body 33 may project through the trim cover 20.

In the embodiment shown in FIG. 16, the flap portion 58 and the remainder of the cover portion 34 do not extend outside of the trim cover 20 during and after inflation of the main body 33. In another embodiment, the flap portion 58 may be configured to extend outside of the trim cover 20 during inflation of the main body 33.

With the above configuration, the flap portion 58 may protect the seat pad 18 and inhibit or prevent portions of the seat pad 18 from breaking off during deployment of the main body 33. The flap portion 58 may also facilitate deployment of the main body 33 by providing a guide surface for the main body 33 and/or by reducing friction between the main body 33 and the seat pad 18 or other components of the seat assembly 10.

Furthermore, because the flap portion 58 and the remainder of the cover portion 34 are formed integrally with the main body 33 of the air bag 32, manufacturing of the air bag module 16 may be simplified. In addition, material consistency for the main body 33 and cover portion 34 can be ensured.

Figure 17:
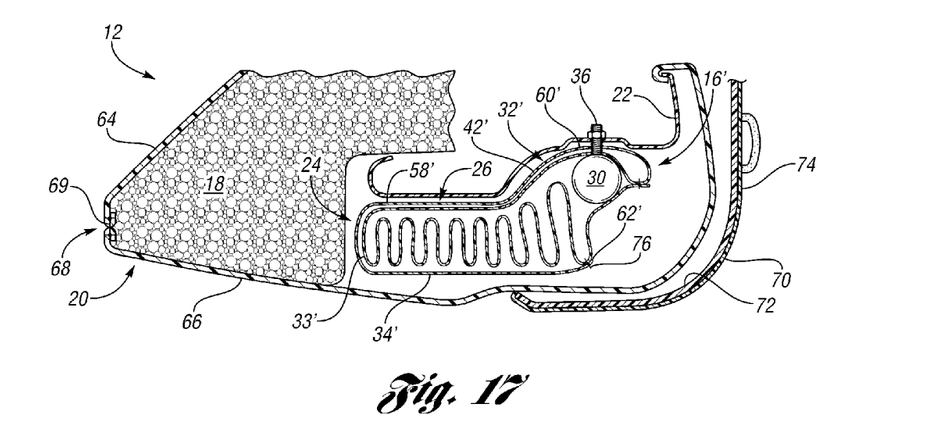
FIG. 17 is a cross-sectional view of another embodiment of an air bag module according to the present disclosure.
Figure 18:
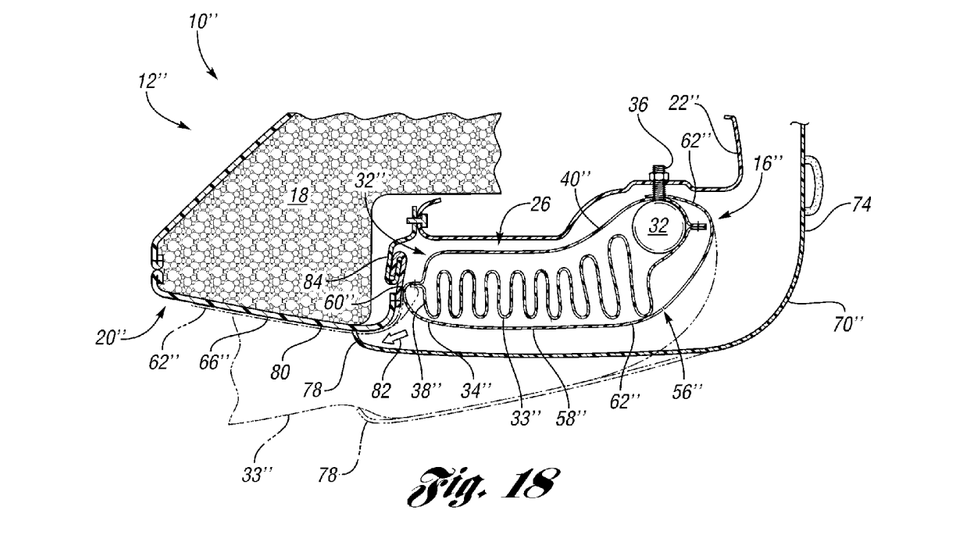
FIG. 18 is a cross-sectional view of yet another embodiment of an air bag module and seat assembly according to the present disclosure, showing an uninflated air bag of the air bag module in solid lines, and a fragmentary view of the air bag as inflated in phantom lines.

FIGS. 17 and 18 show other example embodiments 16' and 16" of an air bag module according to the present disclosure for use with a vehicle seat assembly, such as seat assembly 10. These embodiments function in a similar manner as discussed above in detail.

In the embodiment 16' shown in FIG. 17, flexible cover portion 34' is formed integrally with main body 33' of air bag 32', and the cover portion 34' partially covers the main body 33'. Cover portion 34' includes protection portion 58' having a first portion, such as first end 60', fixedly secured to frame 22 in any suitable manner, such as with one or more of the fasteners 36. The protection portion 58' further has a second portion, such as second end 62', releasably secured to the main body 33' in any suitable manner. For example, the second end 62' may be releasably connected to the main body 33' with a releasable attachment member 76, such as sewn stitching and/or adhesive. As another example, the second end 62' may be welded to the main body 33', such as by an ultrasonic welding operation. Upon inflation of the main body 33', the fasteners 36 or other attachment members are configured to maintain attachment of the first end 60' to the frame 22, while the attachment member 76 or other releasable attachment scheme is configured to allow the end 62' to be released from the main body 33' and extend forwardly, such that the end 62' extends between an outboard side of the seat pad 18 and the main body 33'. With this configuration, the entire cover portion 34', or a substantial portion of the cover portion 34', may function as a flap portion that is configured to extend between the seat pad 18 and the main body 33'.

In the embodiment 16" shown in FIG. 18, main body 33" of air bag 32" deploys between back panel 70" and trim cover 20" of seat back 12" of seat assembly 10". More specifically, main body 33" deploys, in a forward deployment direction, between a front portion 78 of back panel 70" and an outboard side 80 of second section 66" of trim cover 20", as shown in phantom lines in FIG. 18 and as indicated by deployment direction arrow 82. Furthermore, second section 66" of the trim cover 20" is connected, via a J-clip or other suitable fastener, to a plastic retainer member 84, which is attached to a front portion of frame 22" in any suitable manner, such as with one or more fasteners. As another example, the retainer member 84 may be omitted, and the trim cover 20" may be connected directly to the frame 22" such as with one or more J-clips.

Still referring to FIG. 18, air bag module 16" includes a flexible cover portion 34" that is integrally formed with second section 40" of main body 33" of air bag 32", and the cover portion 34" partially covers main body 33". The cover portion 34" has a first end fixedly secured to first section 38" of the main body 33", such as with sewn stitches, and a second end secured to the frame 22 with one or more of the fasteners 36. The cover portion 34" further has a frangible portion 56", such as a perforated, cut or otherwise weakened area, that is spaced away from the second end.

As with the first embodiment, the frangible portion 56" at least partially defines a flap portion 58" having a releasable end 62". Upon inflation of the main body 33", the frangible portion 56" is configured to rupture, such that the end 62" of the flap portion 58" may move forwardly and extend between the inflating main body 33" and the outboard side 80 of the trim cover 20", as shown in phantom lines in FIG. 18.

In the above embodiment, the flap portion 58" sufficiently covers retainer member 84 and the J-clip and protects the main body 33" of air bag 32" during deployment. Furthermore, the flap portion 58" extends over outboard side 80 of the trim cover 20" during air bag main body deployment, and provides a smooth deployment surface for the main body 33".

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the above air bag module embodiments may be use with any suitable vehicle seat configuration, such as any of the above described seat assemblies.

What is claimed is:

1. A vehicle seat assembly comprising:
an air bag module including an air bag and an inflator associated with the air bag, the air bag including a main body configured to be inflated by the inflator and an extension formed integrally with the main body and at least partially covering the main body, wherein the main body has a front, and a portion of the extension extends at least partially along the front of the main body and rearward of the front of the main body, and wherein the portion of the extension has an end disposed rearward of the front of the main body;
a seat pad disposed outside the air bag module; and
a trim cover positioned over the seat pad;
wherein, upon inflation of the main body of the air bag, the end of the portion of the extension is configured to move forwardly such that portion of the extension extends between the seat pad and the main body, or between the trim cover and the main body.

2. The seat assembly of claim 1 wherein the extension substantially encloses the main body of the air bag prior to inflation of the main body.

3. The seat assembly of claim 1 wherein the extension includes a frangible portion that at least partially defines a flap upon inflation of the main body, and wherein the flap comprises the portion of the extension.

4. The seat assembly of claim 3 wherein the frangible portion includes a generally vertical section spaced away from the front of the air bag.

5. The seat assembly of claim 3 wherein the frangible portion comprises a sewn seam.

6. The seat assembly of claim 3 wherein the frangible portion comprises a perforated section.

7. The seat assembly of claim 1 further comprising a seat frame, wherein the air bag module is connected to the frame with a fastener, and wherein the extension includes an opening through which the fastener extends.

8. The seat assembly of claim 7 wherein the extension includes a frangible portion that defines a flap upon inflation of the main body, and wherein the flap comprises the portion of the extension.

9. The seat assembly of claim 1 wherein the end of the portion of the extension is releasably connected to the main body, and wherein, upon inflation of the air bag, the end is configured to be released from the main body.

10. The seat assembly of claim 1 wherein the extension is configured to remain inside of the trim cover during inflation of the air bag.

11. A vehicle seat assembly comprising:
an air bag module having a front and a side, the air bag module including an air bag and an inflator associated with the air bag, the air bag including a main body configured to be inflated by the inflator and an extension formed integrally with the main body and surrounding the main body such that the extension forms an outermost portion of the air bag module, the extension including a frangible portion that at least partially defines a flap portion, the flap portion extending at least partially along the front and the side of the air bag module and having an end spaced away from the front of the air bag module;
a seat pad portion disposed in front of the air bag module; and
a trim cover positioned over the seat pad portion;
wherein, upon inflation of the main body of the air bag, the frangible portion is configured to rupture and the end of the flap portion is configured to move forwardly such that the flap portion extends between the seat pad portion and the air bag, or between the trim cover and the air bag.

12. The seat assembly of claim 11 wherein the frangible portion defines top, bottom and rear portions of the flap portion.

13. The seat assembly of claim 11 wherein the flap portion is configured to cover an outboard side of the seat pad portion or an outboard side of the trim cover during inflation of the air bag.

14. The seat assembly of claim 11 wherein the air bag module has a height, and the frangible portion includes a generally upwardly extending section that extends along a substantial portion of the height of the air bag module, and wherein the generally upwardly extending section is spaced away from the front of the air bag module.

15. The seat assembly of claim 11 further comprising a seat frame, wherein the air bag module is connected to the frame and has an inboard side that faces the frame, and wherein the frangible portion extends at least partially along the inboard side of the air bag module.

16. An air bag module for use with a vehicle seat having a seat pad and a trim cover positioned over the seat pad, the air bag module comprising:

an inflator; and an air bag associated with the inflator, the air bag including a main body configured to be inflated by the inflator and an extension formed integrally with the main body and at least partially covering the main body, the main body having a front, and the extension having a portion that extends at least partially along the front of the main body and includes an end disposed rearward of the front of the main body;

wherein, upon inflation of the main body of the air bag, the end of the portion of the extension is configured to move forwardly such that the portion of the extension extends between the seat pad and the main body, or between the trim cover and the main body.

17. The air bag module of claim 16 wherein the extension surrounds the main body of the air bag prior to inflation of the main body.

18. The air bag module of claim 16 wherein the extension includes a frangible portion that at least partially defines a flap upon inflation of the main body, and wherein the flap comprises the portion of the extension.

19. The air bag module of claim 18 wherein the frangible portion includes a generally vertical section spaced away from the front of the main body.

20. The air bag module of claim 16 wherein the end of the portion of the extension is releasably connected to the main body, and wherein, upon inflation of the air bag, the end is configured to be released from the main body.

* * * * *